April 6, 1937.  J. P. MARTIN  2,076,204
BRICK GRAB
Filed April 14, 1936   3 Sheets-Sheet 1

Inventor
J. P. Martin
By Mason Fenwick & Lawrence
Attorneys

April 6, 1937.  J. P. MARTIN  2,076,204
BRICK GRAB
Filed April 14, 1936   3 Sheets-Sheet 3

Inventor
J. P. Martin
By Mason Fenwick & Lawrence
Attorneys

Patented Apr. 6, 1937

2,076,204

UNITED STATES PATENT OFFICE 2,076,204

BRICK GRAB

James P. Martin, Lancaster, Pa., assignor to Lancaster Iron Works, Lancaster, Pa., a corporation of Pennsylvania Application April 14, 1936, Serial No. 74,381

9 Claims. (Cl. 294—63)

The invention forming the subject matter of this application is a brick lifter or "grab" of the type designed to handle large unit stacks of brick and similar objects, to lift and transport these stacks as units from one location to another.

The main object of the invention is to provide a brick lifter of this character which is of light weight and of great strength in comparison to its weight, and which can be cheaply manufactured and sold.

Other objects of the invention will become apparent as the detailed description thereof proceeds.

Figure 1:
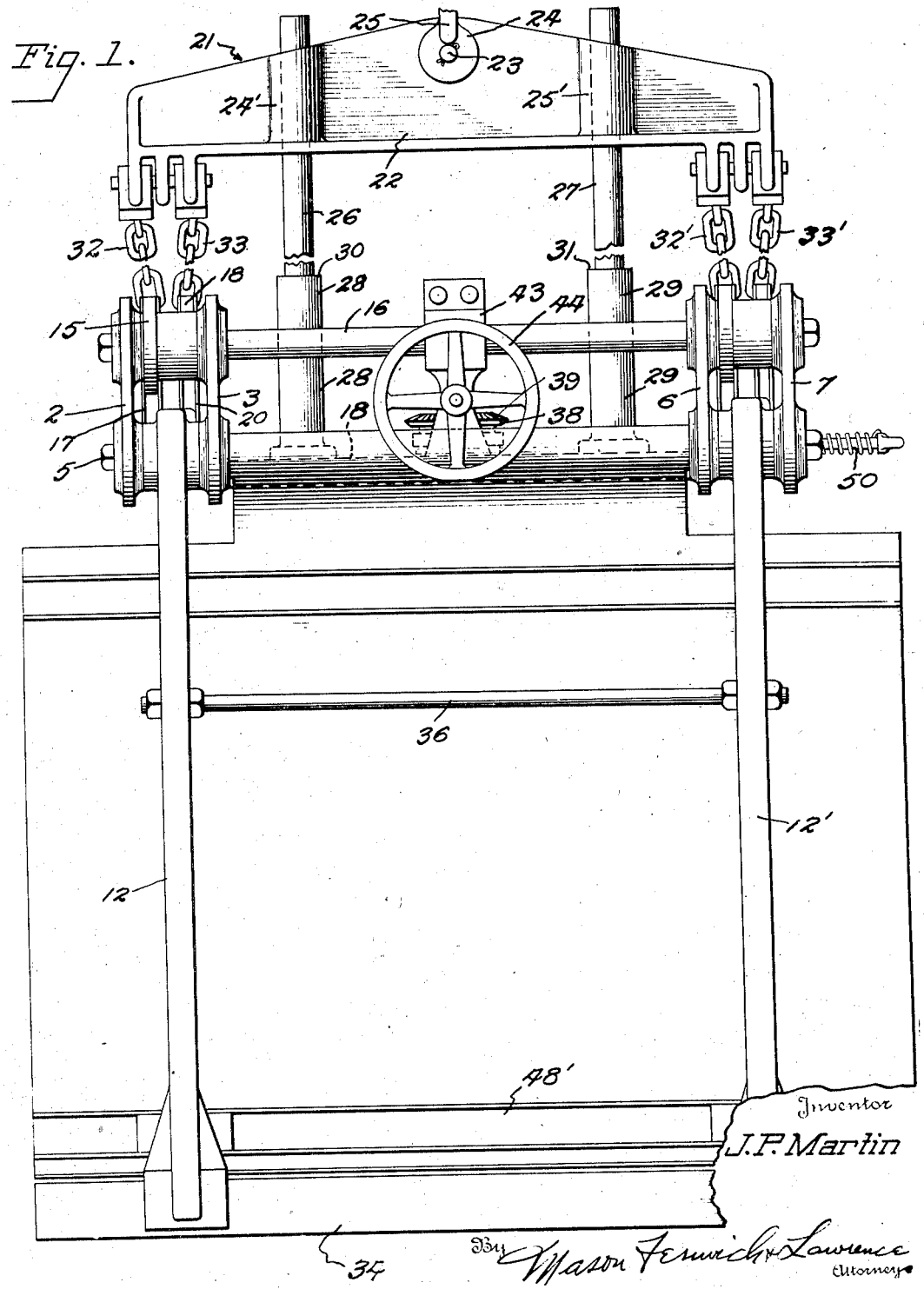
Figure 1 is a side elevation of a preferred form of the invention.

The brick lifter shown in the drawings comprises a substantially rectangular frame designated generally by the reference numeral 1. This frame comprises a pair of side plates 2 and 3 secured at its opposite ends by transverse pivot rods 4 and 5 to a pair of side plates 6 and 7 similar in every respect to the plates 2 and 3. Centrally between the pivot rods 4 and 5, the inner plates 3 and 6 are suitably secured to each other by a transverse plate 8.

Figure 3:
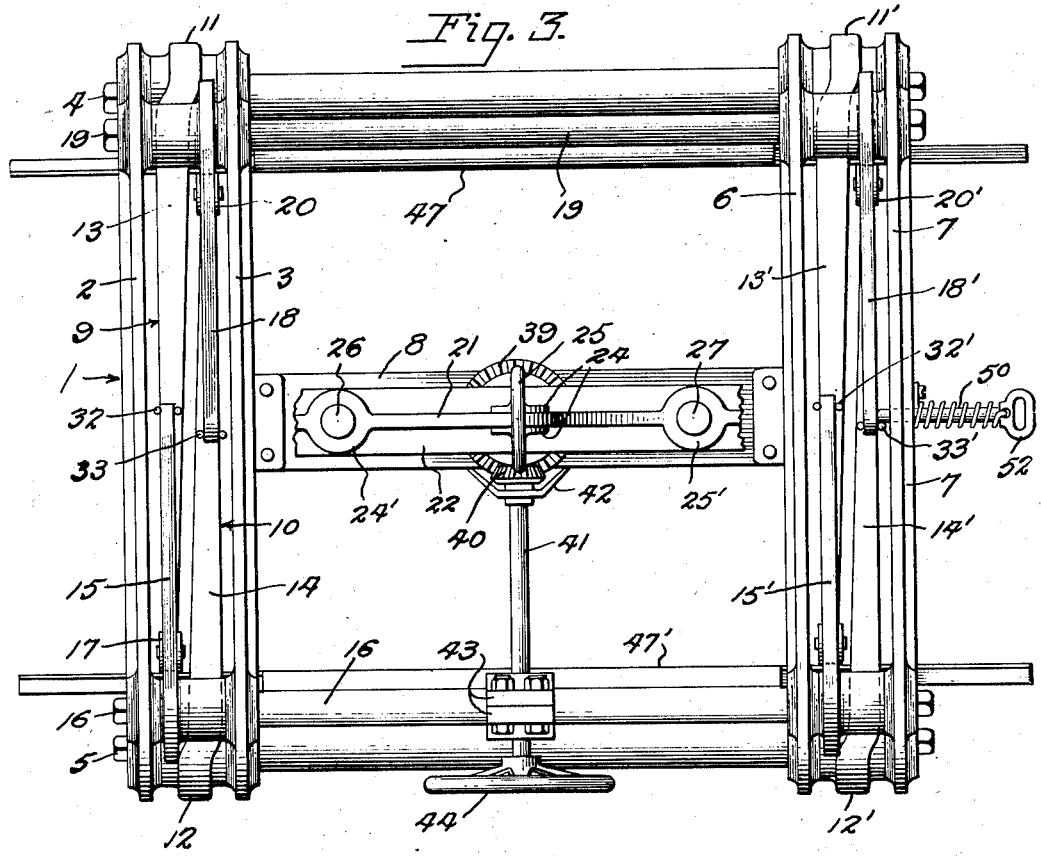
Figure 3 is a broken top plan view of the device illustrated in Figure 1.

As shown in Figures 1 and 3, the side plates 2 and 3 are spaced apart to receive between them the bell crank levers designated generally by the reference numerals 9 and 10. These bell crank levers 9 and 10 are pivoted at their elbows to the pivot rods 4 and 5 of the framework where they extend between the plates 2 and 3. The downwardly extending arms 11 and 12 of the bell crank levers constitute gripping arms or jaws of the same length and are each shaped at their lower ends to receive one end of the grip bars to be described later.

The other arms 13 and 14 of the respective bell crank levers 9 and 10 extend across the framework between the plates 2 and 3; and as shown in Figure 3 are laterally offset with respect to each other in order to provide for compactness in the structure. Directly above the free end of the arm 13, a lever 15 is pivoted to swing about a transverse rod 16 suitably secured to and extending between the side plates 2 and 3. A pair of links 17 are pivoted at one end to the opposite sides of the lever 15 at a suitable distance from the pivot 16. At their other ends the links 17 are pivoted to the opposite sides of the arm 13 and at the end thereof.

Figure 2:
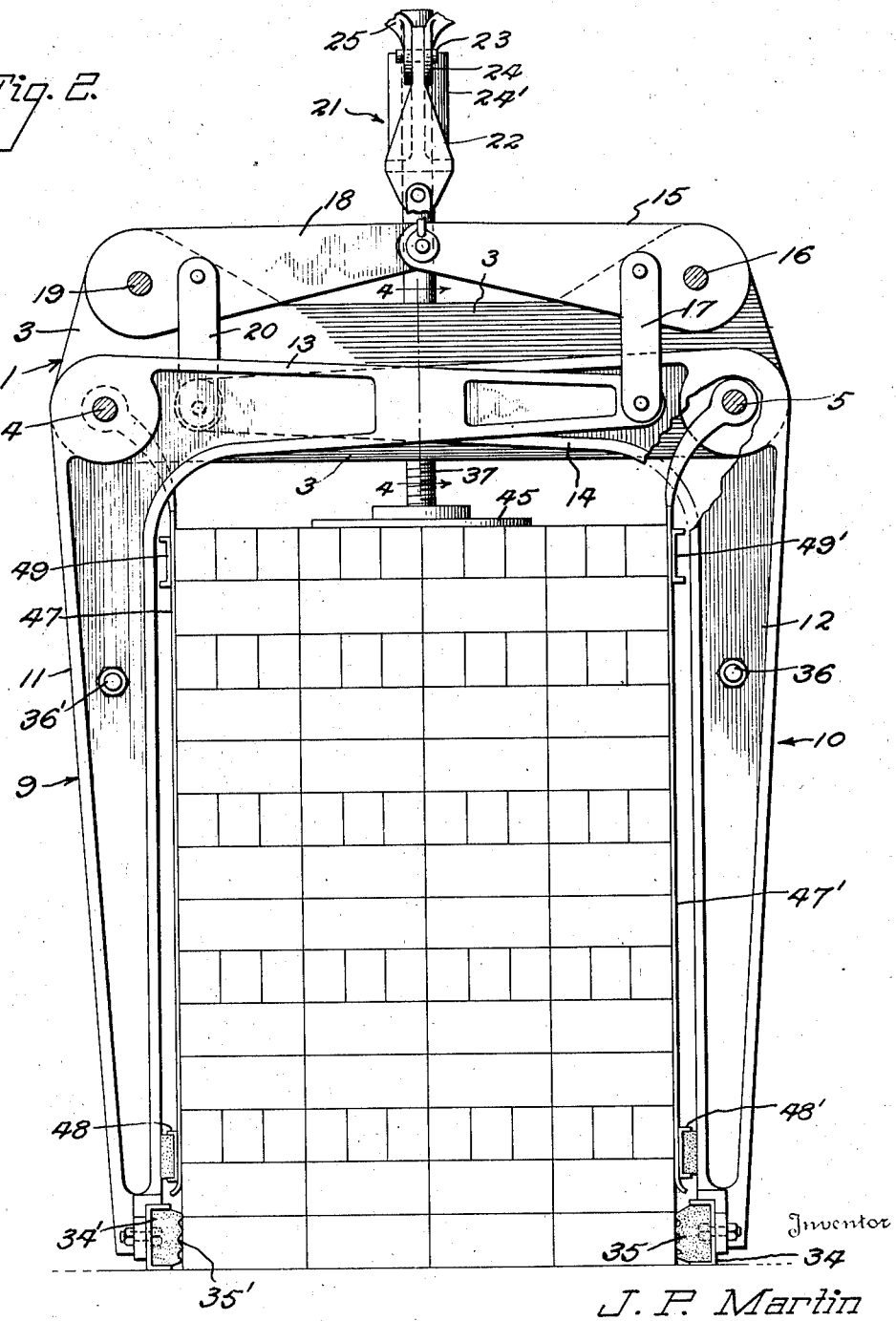
Figure 2 is an end elevation of the device illustrated in Figure 1, with one of the end plates of the supporting framework removed to illustrate details of construction.

Directly above the free end of the arm 14 there is pivoted a lever 18 to swing about a transverse pivot rod 19 suitably secured to and extending between the side plates 2 and 3. A pair of links 20, similar to the links 17, are pivoted at their opposite ends to the lever 18 and to the free end of the arm 14. It will be apparent from Figure 2 of the drawings that the comparatively short levers 15 and 18 have a large lifting effect on the bell crank arms 13 and 14 which extend substantially across the entire width of the brick lifter.

The bell crank and lever mechanisms secured between the side plates 6 and 7 at the other side of the machine are identical in construction with the bell crank and lever mechanisms just described as arranged between the plates 2 and 3. The corresponding parts on said other side are, therefore, designated by the same reference numerals primed, and need not be described in detail.

In order to swing the gripping arms of the lifter toward each other about their pivots 4 and 5, there is provided a lifting head designated generally by the reference numeral 21. This lifting head comprises a casting 22 provided at its center with a pivot pin 23 adapted to receive the bifurcated end 24 of an eye 25 intended to receive a hook from a hoist or traveling crane (not shown).

Equidistantly spaced on opposite sides of the pivot 23, the head 21 is provided with bosses 24' and 25' suitably bored to receive slidably the upper reduced ends 26 and 27 of guide rods 28 and 29 which are fixed at their lower ends to the transverse supporting plate 8. The shoulders 30 and 31 formed on the guide rods 28 and 29 constitute stops to limit the downward movement of the head 21 toward the frame 1.

One end of the head 21 is pivotally connected to the free end of the lever 15 by a chain or cable 32. The same end of the head 21 is also pivotally connected to the free end of the lever 18 by a chain or cable 33. The other end of the head 21 is similarly connected to the levers 15' and 18' by the chains 32' and 33'.

The gripping arms 12 and 12' as shown in Figure 1, are recessed at their lower ends to receive a channel iron 34 which is suitably secured by welding or otherwise to the said lower ends. This channel iron 34 forms a seat for a grip 35 which is preferably formed as a corrugated bar or strip of resilient material. This bar or strip 35 is detachably secured in any suitable manner in the channel 34 and is intended to be renewable.

It has been found in actual practice that the springs commonly used in prior brick lifters of this general type to grip the lower ends of a stack break very readily in cold weather and thereby cause a collapse of the pile of bricks intended to be lifted. The resilient strips of the present invention yield sufficiently to compensate for inequalities in the bottom row of bricks in the pile to be lifted and are not subject to breakage, as is the case with the aforesaid springs. The gripping arms 12 and 12' are also suitably braced apart by a cross rod or strut 36. The gripping arms 11 and 11' at the other side of the machine are connected by a channel iron 34' and strut 36' in the same manner as just described for the arm 12.

In order to prevent buckling of the pile of bricks during the lifting operation, a rod 37 is keyed to slide nonrotatably through a suitable aperture in the plate 8. This rod 37 is screw-threaded and meshes with the internally screw-threaded aperture in a nut 38 which is provided with a flange forming a bevel gear 39 meshing with a bevel pinion 40. The pinion 40 is secured to the end of a shaft 41 journaled at one end in a bearing bracket 42 suitably secured to the plate 8. The other end of the shaft 41 is journaled in a bearing bracket 43 clamped to the transverse rod 16, and the outer end of the shaft 41 has a hand wheel 44 secured thereto and by means of which the shaft may be rotated to adjust the rod 37 toward and from the frame 1. The lower end of the rod 37 has secured thereto a flat plate 45 adapted to contact, over comparatively large area, with the top of a stack of bricks to be lifted, so as to prevent buckling of the stack during the lifting thereof, and also to form a gage by means of which the rubber grips at the lower end of the gripping arm may be adjusted to correspond with the depth of the pile of bricks to be lifted.

The pivot rod 4 of the frame has pivoted thereto an apron 47 which extends downwardly along the inside edges of the gripper arm 11 and 11'. It will be noted that this apron is offset laterally and inwardly with respect to its pivot 4, so that the lower end of the apron would swing outwardly by gravity against the inner edges of the gripper arms 11 and 11'. The lower end of the apron 47 may be provided with a stiffening channel 48 in which blocks of rubber may be inserted to form spacers between the lower end of the apron 47 from the aforesaid gripping arms. Any suitable number of cross braces 49 may be secured to the apron 47. The apron 47' is pivoted to swing about the pivot rod 5 at the other end of the frame, and is substantially the same in every respect as the apron 47.

The aprons 47 and 47' are not intended to grip the sides of the stacks of brick. In fact, they must not grip, because such gripping would prevent the rubber grip bars 35 and 35' from properly engaging the lower tier of bricks in order to lift the pile. These aprons are intended primarily to prevent collapse of the pile of bricks during the lifting and transportation thereof.

Figure 4:
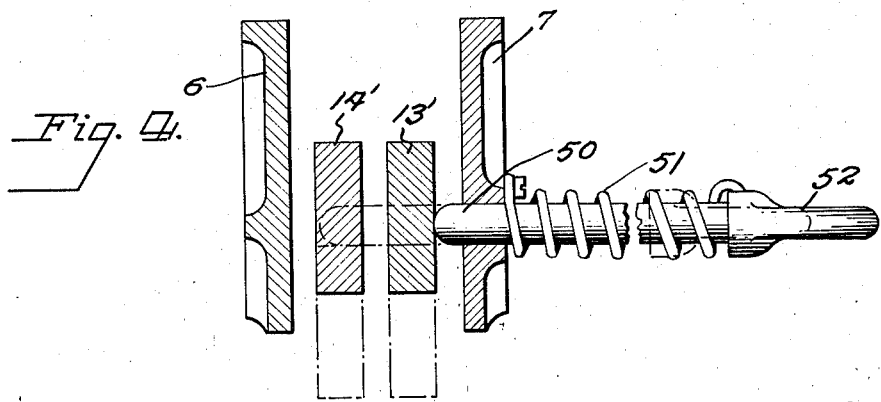
Figure 4 is a section to an enlarged scale taken on the line 4—4 of Figure 2.

This brick lifter is provided with automatically operable means to hold the gripping arms spread apart from gripping position during the lowering of the lifter over a stack of bricks. This means is designed also to hold the gripping arms in their spread apart position after a pile of bricks has been deposited in a desired location. This locking mechanism comprises a bolt 50 mounted to slide in the side plate 7. The inner end of the bolt 50 is rounded as shown in Figure 4 of the drawings, and rides normally in contact with the side of the arm 13' of the bell crank lever structure 10 when the gripping arms are in their stack gripping position.

When the gripping arms are expanded, as a preliminary to insertion over a brick pile, the bolt 50 is forced over the top edges of the lever arms 13' and 14' by means of the tension spring 51 connected at one end to the side plate 7, and at its other end to a handle 52 formed on the end of the bolt 50. When the lifter is inserted in open position over the stack of bricks to be lifted, the bolt 50 must be withdrawn manually from locking position over the upper edges of the levers 13' and 14'. When this is done and the head 21 is lifted, the levers 15 and 18 and the links connected thereto, swing the gripping arms in a gripping position. When the stack is located in the desired position, the lowering of the head 21 on to the stops 30 and 31 releases the pull on the levers 15, 15', 18 and 18'; and the weight of these levers along with that of the horizontal levers of the bell crank mechanism, causes the gripping arms to swing by gravity into open position. And as they swing into spread apart position, the bolt 50 slides automatically into locking position above the top edges of the horizontal arms of the bell crank levers and thereby locks the gripping arms spread apart, so that the lifter may be removed from the deposited stack ready to be inserted over another stack.

The invention may be embodied in other specific forms without departing from the spirit or essential characteristics of the invention, and the present embodiment is therefore to be considered in all respects as illustrative and not restrictive, the scope of the invention being indicated by the appended claims rather than the foregoing description, and all changes which come within the meaning and range of equivalency of the claims are therefore intended to be embraced therein.

What I claim is:

1. A brick grab including a frame, grip jaws pivoted to the frame, levers pivoted to said frame, means connecting said levers and jaws to swing the free ends of said jaws toward and away from each other, a lifting head having bores therethrough, flexible means connecting said head to said levers, and guide means fixed to said frame and slidable in said bores to prevent rotation of the head relative to the frame.

2. A brick grab including a frame, grip jaws pivoted to the frame, levers pivoted to said frame, means connecting said levers and jaws to swing the free ends of said jaws toward and away from each other, a lifting head having bores therethrough, flexible means connecting said head to said levers, and guide means fixed to said frame and slidable in said bores to prevent rotation of the head relative to the frame, said guide means including stops to limit the movement of the head toward said frame.

3. A brick grab including a frame, grip jaws pivoted to the frame, levers pivoted to said frame, means connecting said levers and jaws to swing the free ends of said jaws toward and away from each other, a lifting head having bores therethrough, flexible means connecting said head to said levers, guide means fixed to said frame and slidable in said bore to prevent rotation of the head relative to the frame, and means on said frame for locking said jaws in a predetermined angular relation to said frame.

4. A brick grab including a frame, jaws pivoted to the frame, mechanism operating the jaws, a lifting head having bores therethrough, guides fixed to the frame slidable in said bores, said guides being provided with stops to limit the movement of the head toward said frame, and flexible devices connecting the head to said levers.

5. A brick grab including a frame, jaws pivoted to the frame, mechanism operating the jaws, a lifting head having bores therethrough, guides fixed to the frame slidable in said bores, said guides being provided with stops to limit the movement of the head toward said frame, flexible devices connecting the head to said levers and means engaging said mechanism for locking said jaws in predetermined angular relation to said frame.

6. A brick grab including a frame, grip jaws pivoted to the frame, means on said frame to swing the free ends of the jaws toward and away from each other, and plates pivoted to said frame and depending therefrom to extend across said grip jaws.

7. A brick grab including a frame, grip jaws pivoted to the frame, means on said frame to swing the free ends of the jaws toward and away from each other, plates pivoted to said frame and depending therefrom to extend across the inner faces of said grip jaws, and a plate adjustable in said frame to move between said jaws in a direction substantially perpendicular to the frame.

8. A brick grab including a frame, bell crank levers pivotally connected to opposite ends of the frame, plates pivoted to said opposite ends of the frame and depending therefrom alongside the inner faces of the depending arms of the bell crank levers, other levers pivoted to the frame above the bell crank levers, links connecting the free ends of the horizontal arms of said bell crank levers to said other levers near their pivotal connection to said frame, a head movable relative to said frame, flexible means connecting the head and the free ends of said other levers, and means on the frame for locking the bell crank levers in spread apart position when the head is lowered toward said frame.

9. A brick grab including a frame, gripping jaws pivoted to said frame, means connected to said jaws to swing the free ends thereof toward and from each other, a supporting plate adjustably connected to the center of said frame to move in a direction substantially perpendicular thereto, and plates pivoted to said frame and depending therefrom along the inside faces of said jaws to prevent collapse of a pile of bricks during the lifting thereof.

JAMES P. MARTIN.